Patented Dec. 4, 1934

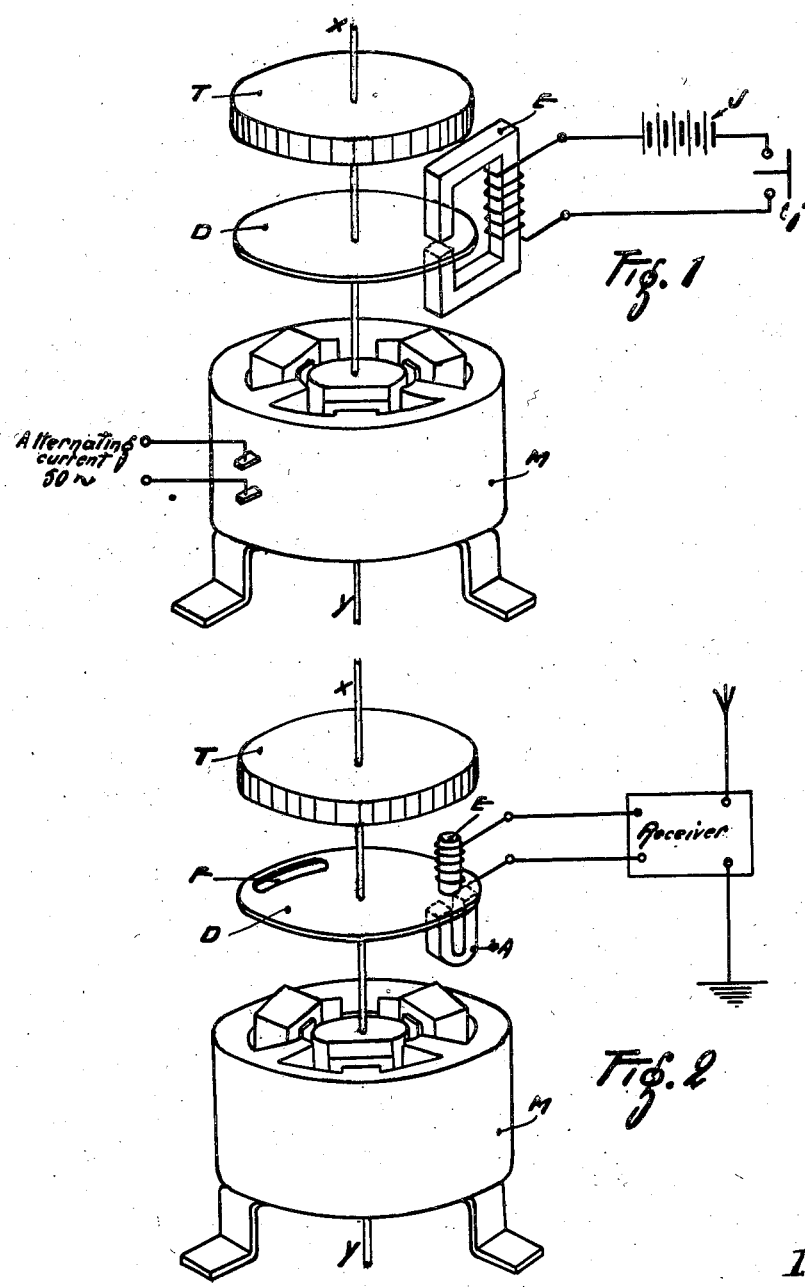

1,983,432

UNITED STATES PATENT OFFICE 1,983,432

SYNCHRONIZING SYSTEM FOR TELEVISION

René Barthelemy, Fontenay-Aux-Roses, France, assignor to Compagnie pour la Fabrication des Compteurs et Material d'Usines a Gaz, Montrouge, France, a joint-stock company of France Application July 5, 1932, Serial No. 620,926
In France July 11, 1931

2 Claims. (Cl. 178—69.5)

It has been proposed in order to obtain synchronism of rotation between the scanning systems at the sending and at the receiving end, for television purposes, to use the electric supply mains in which the current frequency is uniform throughout the network. Despite the convenience of this method, it has not been adopted on account of the variable phase differences existing between the sending point and the numerous receiving points.

It is known moreover that there exists a type of synchronous motor which adjusts itself automatically to the synchronous speed but the rotational phase of which is controlled with great facility by a driving or retarding torque applied to the shaft of the motor. Although this type of motor does not form the object of the present invention, which has reference only to a particular application thereof, its chief features will be briefly recapitulated for a proper understanding of the invention.

Said synchronous motor is constituted by a rotating member, generally a cylinder made of magnetic material, having a high hysteresis coefficient and which is placed in a rotating field produced by the electric supply through the agency of various known means. The motor starts up without the need for any previous impulsion and rapidly reaches a constant speed which only depends on the frequency of the supply and on the number of the poles producing the rotating field. By making a mark on the rotating member, the rotational phase can be examined and it is found that it remains practically constant with respect to the phase of the supply voltage provided that no external variable torque be applied in the course of rotation. But if, for example, substantial friction be produced, the phase difference widens and then becomes constant again at a new value as soon as the friction has been removed.

A rotary system is thus obtained which revolves at constant speed but the rotational phase of which is easily adjusted within as wide limits as may be desired without mechanically offsetting the polar shoes.

The present invention is concerned with the application of such a motor to television receivers by adjusting the rotational phase either through the instrumentality of the user of the receiving apparatus, or automatically through the medium of signals sent out by the television transmitting apparatus. It will be understood that it is then possible to use the electric supply as the synchronizing link, a simple method being used to correct the phase.

In the accompanying drawing:

Fig. 1 illustrates a circuit arrangement in which the phase is adjusted at the receiving end by an intermittent electrical braking torque controlled by the owner of the receiving set.

Fig. 2 illustrates a modified circuit arrangement in which the phase is automatically adjusted by signals sent out by the transmitting apparatus.

In the circuit arrangement of Fig. 1, the synchronous motor M operating by hysteresis is fed from the same alternating current supply as the synchronous motor used for scanning at the transmitting end.

On the spindle XY of the motor M is mounted a conducting disc D which rotates between the poles of an electromagnet E. When, through the agency of the switch I, a current supplied by the source S is caused to flow through the electromagnet E, a resisting torque is created which tends to retard the movement of the rotor of the motor M and, if sufficiently high, to cause the rotor to slip relatively to the phase of the rotating field without the motor dropping out of step however.

Finally, on the spindle XY is mounted the optical television device (perforated disc or drum T with rotating mirrors) for traversing the receiving screen.

If a motor having three pairs of poles is used both at the sending and at the receiving end, if the alternating current supply is of 50 cycles, the speed of rotation is 16⅔ R. P. S., so that a normal rate of change of the television images is obtained.

The system is operated as follows:

The 50 cycles current is switched on to the motor M. The latter picks up to synchronous speed almost instantaneously. The drum T which receives a modulated light beam thus gives a reconstructed image on a screen which image is generally not properly centered. Current is then sent through the electromagnet E by closing the switch I. The image is slowly shifted and when it has reached a suitable position, the switch I is thrown open and from this moment the image stops moving.

The preceding device suffers under the drawback that the user of the television apparatus is obliged to regulate his image adjustment if phase variations of his feed voltage relative to the voltage of the transmitting set occur.

Fig. 2 provides an automatic adjustment by the dispatching at each revolution of the motor of the transmitting set, of a short signal which therefore corrects 16 times per second any shifting of the image that may occur. Said short signal, which, to all practical purposes, does not encroach on the periods of image scanning, sets up an oscillation of greater duration in the television receiver. This oscillation is renewed at a rate which is controlled with great accuracy by the transmitting apparatus itself.

It is this beat current originating from the receiving apparatus after several filtering operations which is applied to a second synchronous motor member, either of the standard known two pole type mounted on the spindle XY of the receiving motor, or of the induction type, and which is composed of a disc D having a slot F and which is subjected to the pulsating field produced in the electromagnet E by the current from the receiver, and likewise to the constant field of the magnet A.

In these circumstances, the phase of the pulsatory current controls the rotational phase; the latter is therefore in point of fact, controlled by the transmitting apparatus and the user has no adjustment to make in order to correct the phase variations of the feed voltage.

The phase can likewise be adjusted by directly subjecting the magnetic rotor of the motor M to a continuous auxiliary field manually adjustable, or to a pulsating field controlled by the transmitting apparatus as has just been described. Thus is adjusted the angular setting on the shaft of the fictitious magnet which is created in the magnetic cylinder.

I claim:

1. The combination of a synchronous motor including a magnetic rotor having a high hysteresis coefficient and a rotating field fed from the electric supply mains, a television receiving apparatus including an optical device mounted on the shaft of said synchronous motor and adapted to traverse the receiving screen on which the image is to be reconstructed, a disc made of conducting material mounted on the shaft of said motor, electromagnetic means for exerting a braking torque on said disc whereby the rotational phase of said synchronous motor may be varied, said disc having a slot formed in a predetermined sector thereof in a path passing through the axis of the electromagnetic means, and means controlled by the electric supply current for periodically energizing said electromagnetic means.

2. The combination of a synchronous motor including a magnetic rotor having a high hysteresis coefficient and a rotating field fed from the electric supply mains, a television receiving apparatus including an optical device mounted on the shaft of said synchronous motor and adapted to traverse the receiving screen on which the image is to be reconstructed, a disc made of conducting material mounted on the shaft of said motor, electromagnetic means for exerting a braking torque on said disc whereby the rotational phase of said synchronous motor may be varied, said disc having an arcuate shaped slot formed in a predetermined sector thereof in a path passing through the axis of the electromagnetic means, and means controlled by the electric supply current for periodically energizing said electromagnetic means.

RENÉ BARTHELEMY.